Feb. 13, 1968   J. C. LEJON   3,369,186
DUAL OUTPUT AMPLIFIER
Filed Feb. 12, 1964

INVENTOR.
JEAN CHARLES LEJON
BY
John F. Lukra
ATTORNEY

United States Patent Office 3,369,186
Patented Feb. 13, 1968

3,369,186
DUAL OUTPUT AMPLIFIER
Jean C. Lejon, Paris, France, assignor to Societe dite:
Controle Bailey, a company of France
Filed Feb. 12, 1964, Ser. No. 344,486
Claims priority, application France, Apr. 30, 1963,
933,339
2 Claims. (Cl. 330—10)

ABSTRACT OF THE DISCLOSURE

An amplifier circuit, responding to direct voltage input signals and providing two independent output signals; one a low impedance output for supplying a control signal which is proportional to the input signal and the second a high impedance output for supplying a feedback signal to the circuit input terminal which is related to the first output signal by a ratio of the high impedance to the low impedance.

This invention relates to an electronic controller. In particular this invention relates to a controller wherein the amplifier has two independent outputs; one, a low impedance output for supplying a control signal and the second a high impedance output for supplying a feedback signal.

To regulate a variable such as fluid flow in accordance with an assigned setpoint, the output signal from a controller positions a final control element; for example, a valve. The controller output and consequently the control action imparted to the final control element depends upon the controller input signal. This input signal represents in the simplest case a deviation of the variable from its assigned setpoint. In a closed-loop system, the positioning of the final control element eventually corrects the variable and the input signal deviation is finally zero.

Controllers usually employed in a system such as this have both proportional and integral action. Proportional action in a controller establishes a control signal that varies in accordance with the following equation:

$$E_o = -K_1 E_{in}$$

where:

$E_o$ is the controller output signal,
$E_{in}$ is the controller input signal,
$K_1$ is the over-all amplifier gain.

Integral action in a controller, which is necessary for complete restoration of the variable to its assigned setpoint in a limited time, establishes a feedback signal the rate of change of which is proportional to the input signal deviation from its assigned setpoint. In equation form:

$$E_f = -K_2 \int_{t_1}^{t_2} E_{in} dt$$

where:

$E_f$ is the controller feedback signal,
$E_{in}$ is the controller input signal,
$K_2$ is a constant which determines the rate of integration for a given $E_{in}$ and is generally expressed as "repeats per minute."

Combining the proportional expression with the integral expression, the equation for the output signal takes the following form:

$$E_o = -K_1 \left[ E_{in} + K_2 \int_{t_1}^{t_2} E_{in} dt \right]$$

since the controller gain and the repeats per minute must be adapted to each particular control system the ability to adjust these parameters is an important quality of a controller.

An electronic controller of the type here under consideration having both proportional and integral action has an input resistance $R_{in}$, a feedback resistance $R_f$ and a feedback capacitor $C_f$. The controller gain $K_1$ is determined by the ratio of feedback resistance to input resistance and is preferably adjusted by means of a variable input resistance. The "repeats per minute" associated with the integral action is determined by the product of $R_f C_f$ and is preferably adjusted by means of a variable feedback capacitor.

Because of the wide range of variables to be controlled it is often necessary to use very large capacitors in the feedback loop to obtain a given integration constant $K_2$ and at the same time a sufficiently high controller gain $K_1$. The alternative is to increase the input resistor $R_{in}$ which would require an increase in the feedback resistor $R_f$ for a given controller gain. But such method would result in an increase in device drift.

Normally the feedback circuit of a controller is connected to a low impedance output circuit. In my controller the feedback circuit is connected to a second output circuit having a high impedance which is effective to reduce the capacitance requirements of the feedback capacitor by a figure equal to the ratio of the two output impedances. The input resistor $R_{in}$ for a given controller gain may also be reduced resulting in a proportional reduction of the device drift.

One embodiment of the controller of my invention includes a five stage direct coupled transistorized direct current amplifier. The high impedance output circuit is connected to the collector electrode of a fifth stage and the low impedance output circuit to the emitter electrode of the same stage. In another embodiment of my invention the controller consists of a modulator for converting the D-C input signal into an alternating signal. This variable signal is amplified in an alternating amplifier and finally demodulated into two direct current signals by separate demodulators. One demodulator has a low gain and low internal impedance for establishing the controller output. The other demodulator has a high gain and high internal impedance for establishing a feedback signal.

One object of my invention is to provide an electronic controller with proportional plus integral action using a feedback capacitor with a low capacitance.

Another object of my invention is to provide an electronic controller comprising an amplifier having a low impedance output and a high impedance output, the high impedance output of which is effective to reduce the capacitance requirements of the feedback capacitor by the figure equal to the ratio of the two output impedances.

Still another object of my invention is to provide an electronic controller having an output signal of the same polarity as the input signal.

Various other objects and advantages will appear from the following description and the novel features will be particularly pointed out in the appended claims.

Figure 1:
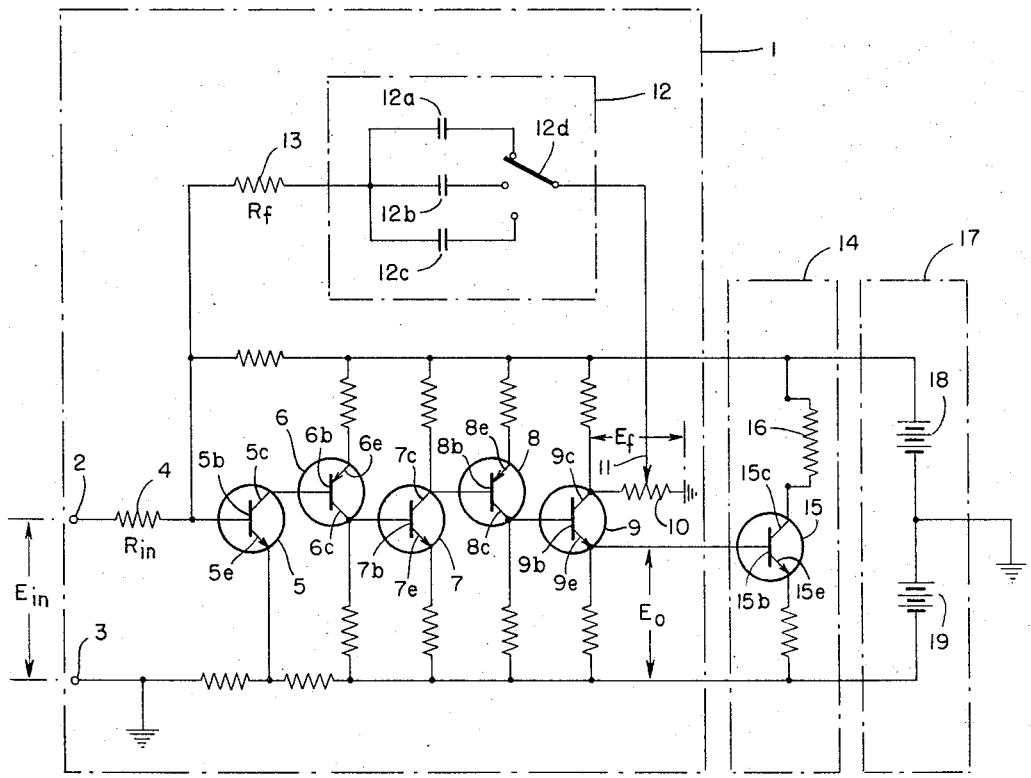
FIG. 1 is a schematic diagram of a controller having proportional plus integral action employing direct current amplification.

Referring now to FIG. 1 there is shown a proportional plus integral controller 1 consisting of a solid state operational amplifier having input terminals 2 and 3. An input resistance 4, with a value $R_{in}$ is connected to terminal 2. Terminal 3 is connected to a common ground.

The solid state operational amplifier shown in FIG. 1 has five direct coupled transistorized stages 5–9. Each stage of amplification is alternately made up of an N-P-N or P-N-P transistor. Stage 5 is an N-P-N transistor with its collector electrode 5c connected to the base electrode 6b of the second amplifying stage 6. Alternating between N-P-N and P-N-P transistors, the second stage 6 is of the P-N-P variety with its collector electrode 6c connected to the base electrode 7b of a third transistor stage 7. The remaining three transistorized stages 7, 8 and 9 employ N-P-N, P-N-P and N-P-N transistors in that order. All last four stages are connected from the collector of the of the preceeding stage to the base of the subsequent stage and since I do not employ interconnecting components the amplifier is known as a direct-coupled amplifier.

Connected to the collector electrode 9c of the last stage and to common ground is a potentiometer 10 having a wiper arm 11. The wiper arm 11 is connected through a switch 12d to a group of capacitors 12, the group consisting of capacitors 12a, 12b and 12c, each of varying size for adjustment of the repeats per minute as discussed previously. In series with the condensers 12, also in the feedback circuit, is a feedback resistor 13 which in turn is connected to the base electrode 5b of the first transistor stage 5. The wiper arm 11 divides the voltage developed at collector electrode 9c before being applied to the feedback circuit of capacitors 12 and resistor 13. By adjusting the position of wiper arm 11 the over-all amplifier gain is varied.

Connected to the emitter electrode 9e of the last transistor stage 9 is a load circuit 14. The load circuit 14 includes a power amplifier incorporating an N-P-N transistor 15 with a base electrode 15b directly connected to the emitter electrode 9e of transistor stage 9. Connected to the collector electrode 15c of the power amplifier is the controller load here represented by a resistor 16.

Both the five stage amplifier and the load circuit 14 are energized from a common power supply 17. As shown the power supply consists of a positive source 18 and a negative source 19 with the common terminal connected to ground. Load resistor 16 of load circuit 14 is connected to the positive supply 18. The emitter electrode 15e is connected to the negative supply 19 through a biasing resistor. In the amplifier the emitter electrodes of the P-N-P transistors 6 and 8 and the collector electrodes of the N-P-N transistors 7 and 9 connect to the positive supply 18. The negative supply 19 connects to the emitter electrodes of the N-P-N transistors 5, 7 and 9 and the collector electrodes of the P-N-P transistors 6 and 8.

Since each of the four transistors 6–9 has its base connected to the collector electrode of the preceding transistor, which is of the opposite type, a signal $E_{in}$ applied to the base electrode 5b of the transistor 5 through the input resistor 4 is successively amplified by each of the five stages. Signal $E_{in}$ establishes signals $E_o$ and $E_f$ across the emitter and collector electrodes respectively of transistor 9. The current in the collector circuit of transistor 9 is nearly that of the emitter circuit, they differ only by the base current, so that the voltages $E_f$ and $E_o$ of opposite polarities are in the same ratio N as the load resistances.

The signal $E_o$ has the same polarity as the input signal $E_{in}$ and is the output signal $E_o = K_1 E_{in}$ from the controller 1. The signal $E_f = -NE_o$ of the opposite polarity of $E_{in}$ and $E_o$ is the feedback voltage applied to capacitors 12 and resistor 13. Then for a given over-all gain $K_1$, the value of the resistor 13 is not $K_1 R_{in}$ but $nK_1 R_{in}$. For a given "repeats per minute" determined by the product $R_f C_f$ the capacitance of the capacitor 12 is correlatively divided by the same factor N. The value of N may be adjusted by means of the wiper-arm 11 by varying the proportion of the signal $E_f$ applied to the feedback circuit and the "repeats per minute" of said circuit by selecting in the group 12 by means of the switch 12d the capacitor of the desired capacitance.

Figure 2:
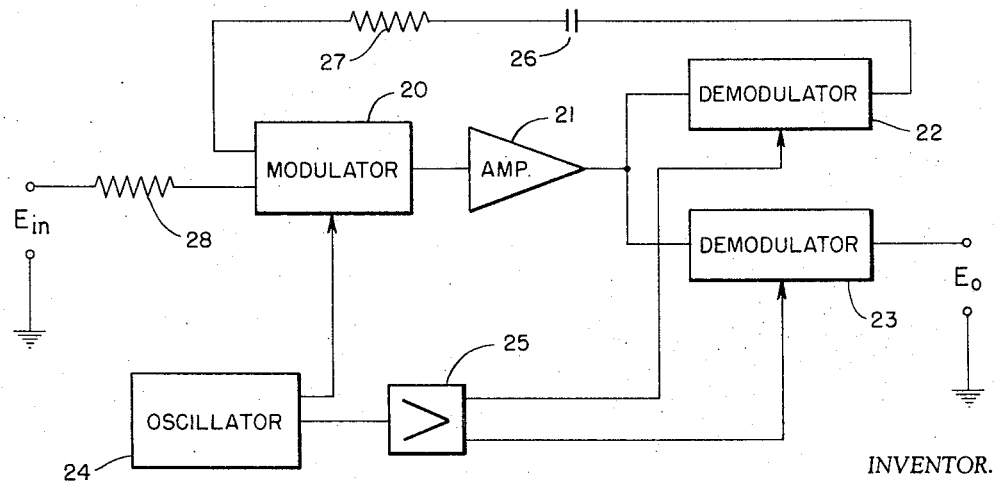
FIG. 2 is a block diagram of a second embodiment of my invention wherein the modulation, amplification and demodulation is used.

Referring now to FIG. 2 there is shown the controller using the modulation, amplification and demodulation principle. The direct current input signal which represents the deviation of the variable from its assigned setpoint is applied through resistor 28 to the input of a modulator 20. Modulator 20 transforms the direct current input signal into an alternating signal with an amplitude proportional to the absolute value of the D–C input signal. The phase of the alternating signal from the modulator 20 is determined by the polarity of the direct current input signal. Any modulator be it mechanical, solid state, photoelectric, capacitance variation or any other well known design can be used in this application. Whichever is used is a matter of design consideration and will not be discussed further.

Connected to the modulator 20 is an alternating signal amplifier 21 which amplifies the output signal of modulator 20. This amplifier can be of the type illustrated and described in the application of John C. Martin, Serial No. 136,278, filed Sept. 6, 1961.

The output signal of the amplifier 21 is demodulated in two demodulator units 22 and 23. Demodulator 22 has a high gain and high internal impedance and its demodulated output signal is the feedback voltage applied to the feedback capacitor 26 and feedback resistor 27. Demodulator 23 has a low gain and low internal impedance which establishes the controller output signal. The high internal impedance in the one case and the low impedance in the other are the only requirements for demodulators used in my circuit; otherwise, any of the well known designs can be employed. In developing the system of FIG. 2, I used diode modulators and demodulators with the carrier frequency necessary to operate these units supplied by an oscillator 24. Power amplifier 25 provides the necessary power requirements of demodulators 22 and 23.

It will thus be seen that the objects set forth above and those made apparent from the preceeding description are effectively obtained. Since certain changes may be made in the above construction without departing from the scope of the invention it is intended that all matters contained in the above description and shown in the accompanyng drawings shall be interpreted as illustrative and not as limiting.

What I claim as new and desire to secure by Letters Patent of the United States is:

1. In an electronic controller having an input terminal for receiving an input signal, a feedback gain control circuit having an output terminal and an input terminal, the output terminal being connected to said controller input terminal; a voltage amplifier having an input terminal connected to said controller input terminal and a first and second output terminal, a low impedance output circuit connected to said first amplifier output terminal for supplying an output signal to a controller load circuit, and a variable potentiometer high impedance output circuit having an input terminal connected to the second amplifier output terminal, said potentiometer having a wiper arm connected to the input terminal of said feedback circuit for establishing a feedback signal related to the output signal by a ratio of said variable high output impedance to said low output impedance.

2. In an electronic controller as claimed in claim 1 wherein said feedback circuit consists of a plurality of capacitors connected in parallel, a resistor connected in series between the parallel capacitor arrangement and the output terminal of said feedback circuit, and a selector means connected between the input terminal of said feedback circuit and the parallel capacitor arrangement for inserting one of said capacitors in series with the input terminal of said feedback circuit and the resistor, whereby the variable voltage feedback signal generated by the high impedance potentiometer output circuit will permit the selection of a capacitor, the capacitance value of which can be minimized for high voltage feedback signals.

References Cited

UNITED STATES PATENTS 2,961,614  11/1960  Neff _____ 330—10
3,101,451  8/1963  Burgarella et al. _____ 330—10

ROY LAKE, *Primary Examiner.*

NATHAN KAUFMAN, *Examiner.*